(12) United States Patent
Kawan et al.

(10) Patent No.: US 6,978,250 B1
(45) Date of Patent: Dec. 20, 2005

(54) SYSTEM AND METHOD FOR AUTOMATED ELECTRONIC SCRIP TRANSACTIONS

(75) Inventors: Joseph C. Kawan, Hollywood, CA (US); Melvin Takata, Thousand Oaks, CA (US); Coleman Hanover, Westpoint, MA (US)

(73) Assignee: Citicorp Development Center, Inc., Los Angeles, CA (US)

( * ) Notice: Subject to any disclaimer, the term of this patent is extended or adjusted under 35 U.S.C. 154(b) by 495 days.

(21) Appl. No.: 09/313,297

(22) Filed: May 17, 1999

Related U.S. Application Data

(60) Provisional application No. 60/086,603, filed on May 22, 1998.

(51) Int. Cl.⁷ ............................................. G06F 17/60
(52) U.S. Cl. ........................... 705/14; 705/39; 705/65; 705/69
(58) Field of Search ............................. 705/14, 65, 69

(56) References Cited

U.S. PATENT DOCUMENTS

| | | | |
|---|---|---|---|
| 5,224,162 A | 6/1993 | Okamoto et al. ............. | 380/24 |
| 5,453,601 A * | 9/1995 | Rosen ......................... | 705/65 |
| 5,471,669 A | 11/1995 | Lidman ....................... | 235/383 |
| 5,511,121 A * | 4/1996 | Yacobi ........................ | 705/69 |
| 5,592,376 A | 1/1997 | Hodroff ...................... | 395/230 |
| 5,687,323 A | 11/1997 | Hodroff ...................... | 395/230 |
| 5,710,886 A | 1/1998 | Christensen et al. ........ | 395/214 |
| 5,753,899 A | 5/1998 | Gomm et al. ................ | 235/381 |
| 6,105,001 A * | 8/2000 | Masi et al. .................... | 705/14 |

FOREIGN PATENT DOCUMENTS

| | | | |
|---|---|---|---|
| WO | WO 97/03423 | 1/1997 | ........... G07F 19/00 |
| WO | WO 99/03075 | 1/1999 | ............ G07F 7/00 |
| WO | WO 99/03076 | 1/1999 | ............ G07F 7/00 |

OTHER PUBLICATIONS

*Article entitled, "Electronic Banking Moves Beyond ATMs," B. Dunigan, Arizona Business Gazette, Oct. 19, 1997, Edition: Weekly, Section: Special Section, p. SS11.
*European Search Report, dated Mar. 20, 2000, by Examiner D. Closa for Application No. EP 99 20 1528.
Article entitled, Bricks and Clicks Partnership to Benefit Schools and Nonprofits Sponsored by IC One and Effinity Online, PRNewswire, Jun. 27, 2000.

* cited by examiner

*Primary Examiner*—Eric B. Stamber
(74) *Attorney, Agent, or Firm*—George T. Marcou; Kilpatrick Stoctkon LLP

(57) ABSTRACT

A system and method for performing and settling an electronic scrip transaction between a merchant and a member includes a database storing accounts for one or more participating merchants, scrip distributors, sponsoring organizations, and members. The system also includes merchant terminals, scrip distributor terminals, sponsoring organization terminals, and a system manager terminal, which are interconnected to one another, as well as to the database, over a network, and a member scrip card, such as a magnetic stripe card or a smart card. Transaction information, including the transaction amount, is entered at a merchant terminal and sent over the network to a scrip distributor terminal or system manager terminal, and the member's account is automatically debited by the transaction amount. Additionally, merchant loyalty point credit or tuition credit can be awarded and stored for the member in connection with the transaction amount. The merchant's account is automatically credited with a merchant portion of the transaction amount, and the accounts of one or both of the scrip distributor and the sponsoring organization are credited with respective portions of the balance according to percentages on a look-up table also stored in the database.

69 Claims, 7 Drawing Sheets

SYSTEM MANAGER DATABASE — 10

| List of Consumer Members — 16 | Discount Tables — 18 | Members' Accounts — 17 | Distributors' Accounts — 19 | Organizations' Accounts — 21 | Merchants' Accounts — 23 |
|---|---|---|---|---|---|

SYSTEM AND METHOD FOR AUTOMATED ELECTRONIC SCRIP TRANSACTIONS

CROSS REFERENCE TO RELATED APPLICATIONS

This application claims the benefit of U.S. Provisional Patent Application Ser. No. 60/086,603 filed May 22, 1998.

FIELD OF THE INVENTION

The present invention relates to electronic scrip transactions and more particularly to a system and method for performing and settling transactions using an automated electronic scrip.

BACKGROUND OF THE INVENTION

Typically, scrip is a paper certificate that is sold by organizations to raise funds. In practice, a scrip distributor acquires the scrip from participating merchants and sells the scrip to an organization at an organization discount. In turn, the organization sells the certificates at face value to holders for a profit. The holders then exchange the face value of the scrip for goods or services from the participating merchants. The participating merchants redeem the scrip with the distributor at a deeper, merchant discount, and the distributor also makes a profit. Operationally, the distributor must maintain accounts for its scrip sales to each of the different organizations and for its scrip redemptions by each of the participating merchants. Similarly, the organizations and participating merchants must also maintain accounts on their scrip activity.

Since the scrip is traditionally a hard currency substitute, the scrip sales and scrip redemptions must be recorded in a bookkeeping manner and then settled to the accounts of the distributor, the organizations and the participating merchants. The labor required to manage the various accounts, together with the inherent float time associated with completing a transaction, jeopardize the feasibility of these accounts since the profit margins are small. In addition, the certificates are subject to counterfeiting, because the paper certificates do not have all of the security features of regular U.S. currency.

Scrip is traditionally a paper certificate that can be used as money to purchase goods or services. In the past, scrip has been used as paper money issued for temporary emergency use, such as in war times. However, more recently, scrip is used somewhat like a coupon or gift certificate and is sold by organizations for the purpose of raising funds. In a typical fund raising process, a scrip distributor, such as the National Scrip Center (NSC), a non-profit center run by the Diocese of Santa Rosa, Calif., makes bulk purchases of discounted scrip from any number of over 300 participating local and nationwide businesses, such as The Gap. The discount may vary up to about 30 percent, depending on the terms of the deal that the scrip distributor is able to negotiate with a particular business.

After purchasing the scrip at a discount, the scrip distributor sells the discounted scrip to fund-raising organizations at a distribution price equal to the discounted price plus a small handling fee. The fund-raising organizations then sell the scrip to their members at full value. Thus, the fund-raising organizations collect the difference between the full value of the scrip and the distribution price. For example, a scrip distributor negotiates a deal with a local grocery store to purchase local grocery store scrip at a 6 percent discount.

In the foregoing example, the scrip distributor then keeps 2 percent as a handling fee and sells the local grocery store scrip to organizations at a 4 percent discount. The local organizations then sell the scrip to their members for full value, leaving the organizations with a 4 percent profit. So, in this example, if the scrip certificate has a $100 value, the scrip distributor purchases the scrip for $94 and sells it to the organizations for $96. The organizations sell the scrip certificate to their members for the full $100 value, leaving the organization with a $4 profit for each scrip certificate sold.

Scrip is advantageous in fund-raising, because it can be used as a money substitute for goods that a consumer is already going to buy. This is in contrast to other traditional fund raising events that require donations, such as telethons, or that require the consumer to purchase items that they do not really need, such as cookie sales. The scrip distributed by NSC, for example, can be used to purchase practically anything, including groceries, toys, household goods, restaurant meals, and bus, train or airline tickets.

The current scrip system, however, has a number of drawbacks. The current system for distribution of, and accounting for, traditional scrip is time-consuming and arduous, as the paper certificates are transferred from the participating stores to the distributors, the organizations, and finally to the consumers. Typically the distributor pays the participating merchants on a weekly or monthly basis for scrip. Scrip is sent from each merchant to the distributor, who must manually sort and file the various types of scrip. With the receipt of orders from the numerous organizations, the various merchants' scrip is accumulated for each order and then sent back to the ordering organization. Thus, the current system is essentially an antiquated, manual process.

Further, the current system allows for the distributors' resources to be wasted, as there is a sizable pool of scrip in float for a lengthy time period. Since the distributors pay for the scrip up front, the scrip is in float until the time that it is purchased by an organization. Even when a distributor has a check in hand from an organization, it may take days before the check amount is credited to the distributor's account. Thus, the distributors lose cash flow due to their inventory of scrip.

Moreover, because it is a paper money substitute, scrip has all of the disadvantages of paper money. Scrip is subject to counterfeiting, because the paper certificates do not have all of the security features of regular U.S. currency, such as special paper. Also, it may be easily mutilated or destroyed, such as by leaving it in a garment pocket that goes through a washing machine. Additionally, consumers may find it difficult to keep track of their scrip, as it comes in many different shapes and sizes. Some scrip distributors even issue special wallets just to keep track of scrip certificates.

Additionally, a consumer may be able to use scrip only at the specific business that issued the scrip. This is especially true because of the varying discount rates granted by the different businesses. These discount rates may vary from region to region, or even from store to store. Thus, it is inconvenient for consumers to make sure that they have the proper scrip with them, depending on where they are going.

SUMMARY OF THE INVENTION

It is a feature and advantage of the present invention to provide a system and method for automated electronic scrip transactions which utilizes a generic scrip that can be used at all participating merchants, thus eliminating the need for merchant specific scrip accounts or certificates.

It is another feature and advantage of the present invention to provide a system and method for electronic scrip transactions which automatically settles and records scrip transactions and eliminates manually intensive, time consuming sorting, filing and accounting for scrip certificates.

It is an additional feature and advantage of the present invention to provide a system and method for electronic scrip transactions which utilizes a scrip card for use at a merchant's terminal similar to a debit card, which avoids the inconvenience and risks associated with carrying bulky paper certificates.

It is a further feature and advantage of the present invention to provide a system and method for electronic scrip transactions in which a member pays for scrip credits direct from the member's checking or savings account without directly involving the participating organization in scrip transfers and thus reduces the complexity of the relationships and accounting.

It is a still further feature and advantage of the present invention to provide a system and method for electronic scrip transactions which shifts the advantage of float time on the discounted value of scrip from participating merchants to participating distributors but offsets this shift in terms of the overhead associated with accounting for the scrip transactions, since accounting for scrip transactions is no longer an overhead item for the merchant.

It is an additional feature and advantage of the present invention to provide a system and method for electronic scrip transactions which combines the scrip program with a merchant loyalty program, for example, as a differentiator between merchants.

It is another feature and advantage of the present invention to provide a system and method for electronic scrip transactions in which furnishes a mechanism for awarding, for example, college tuition credits in conjunction with the merchant loyalty program that is combined with the scrip program.

To achieve the stated and other features, advantages and objects of the present invention, an embodiment of the present invention provides a system and method for performing and settling a transaction between a merchant and a member using either merchant specific or generic electronic scrip. The system and method for an embodiment of the present invention makes use of a database storing accounts, for example, for one or more merchants, scrip distributors, sponsoring organizations, and members. The system and method of an embodiment of the present invention also includes terminals for one or more merchants, scrip distributors, sponsoring organizations, and a system manager, which are interconnected to one another, as well as to the database, over a network. The member is provided with a scrip card, such as a magnetic stripe scrip card or a smart scrip card.

In an embodiment of the present invention, the member selects goods or services for a transaction with a participating merchant. Information relating to the transaction, including a transaction amount, is received, for example, by entering the information at a terminal, such as the merchant terminal. The transaction information that is entered at the terminal also includes data from the member's scrip card, such as the magnetic stripe scrip card, or data from an application on the smart scrip card. The data that is entered from the scrip card includes, for example, data identifying the member and the member's account, such as an account number for the member.

In an embodiment of the present invention, the transaction information, including the transaction amount, the member identification, such as the member account number, as well as a transaction request and an identification of the merchant, is automatically sent from the merchant terminal, for example, over a network to at least one of a system manager at the system manager terminal and a scrip distributor at the scrip distributor terminal. When the transaction information is received at either the system manager terminal or the scrip distributor terminal, the receiving entity automatically confirms the member and merchant identification and also confirms that there is a balance in the member account adequate to cover the transaction amount. The member account is either a scrip account storing scrip credits, or the member account can also be a checking account or a savings account of the member.

In an embodiment of the present invention, when the member account balance is confirmed, the member account, such as the scrip account, the checking account, or the savings account, is automatically debited by the transaction amount. At the same time, merchant loyalty point credit is automatically stored for the member in connection with the transaction amount, for example, in a merchant loyalty account, and when the a threshold level of stored loyalty point credit is attained, tuition credit for the member in connection with the transaction amount is also stored, for example, in a tuition credit account of the member. For the member's scrip account, data representing member scrip credit is pre-stored for the member in the member's scrip account by transferring member scrip credit from at least one of a sponsoring organization account and a scrip distributor account in exchange for monetary value from the member, such as cash or check or debiting the member's checking or savings account. Likewise, data representing sponsoring organization scrip credit is stored in the sponsoring organization's account by transferring organization scrip credit from the scrip distributor account. In turn, data representing distributor scrip credit is stored in the scrip distributor account by purchasing the distributor scrip credit from the participating merchant.

In an embodiment of the present invention, when the member's account is debited by the transaction amount, a confirmation of the debit is automatically sent to the merchant at the merchant terminal over the network by at least one of the system manager at the system manager terminal and the scrip distributor at the scrip distributor terminal. A predetermined merchant portion of the transaction amount is also credited, for example, by the system manager or the scrip distributor to the merchant account according to a predetermined merchant percentage of the transaction amount. The predetermined merchant percentage is determined by automatically consulting a look-up table stored in the database that is coupled over the network, for example, to the system manager terminal and the scrip distributor terminal.

In an embodiment of the present invention, when the predetermined merchant portion is credited to the merchant account, a predetermined balance portion of the transaction amount is also automatically credited to at least one of the sponsoring organization account and the scrip distributor account. The predetermined balance portion for the scrip distributor account is automatically determined according to a predetermined scrip distributor percentage of the transaction amount. In turn, the predetermined scrip distributor percentage is in determined by automatically consulting the look-up table that is stored in the database. Likewise the predetermined balance for the sponsoring organization account is automatically determined according to a predetermined sponsoring organization percentage of the transaction amount. However, the balance portion for the sponsoring organization is reduced by deducting any percentage of the transaction amount previously received by the sponsoring organization.

Additional objects, advantages and novel features of the present invention will be set forth in part in the description which follows, and in part will become more apparent to those skilled in the art upon examination of the following or may be learned by practice of the invention.

BRIEF DESCRIPTION OF THE DRAWINGS

FIG. 3 is a table which shows examples of the types of information stored in the system manager database for an embodiment of the present invention;

DETAILED DESCRIPTION

Figure 1:
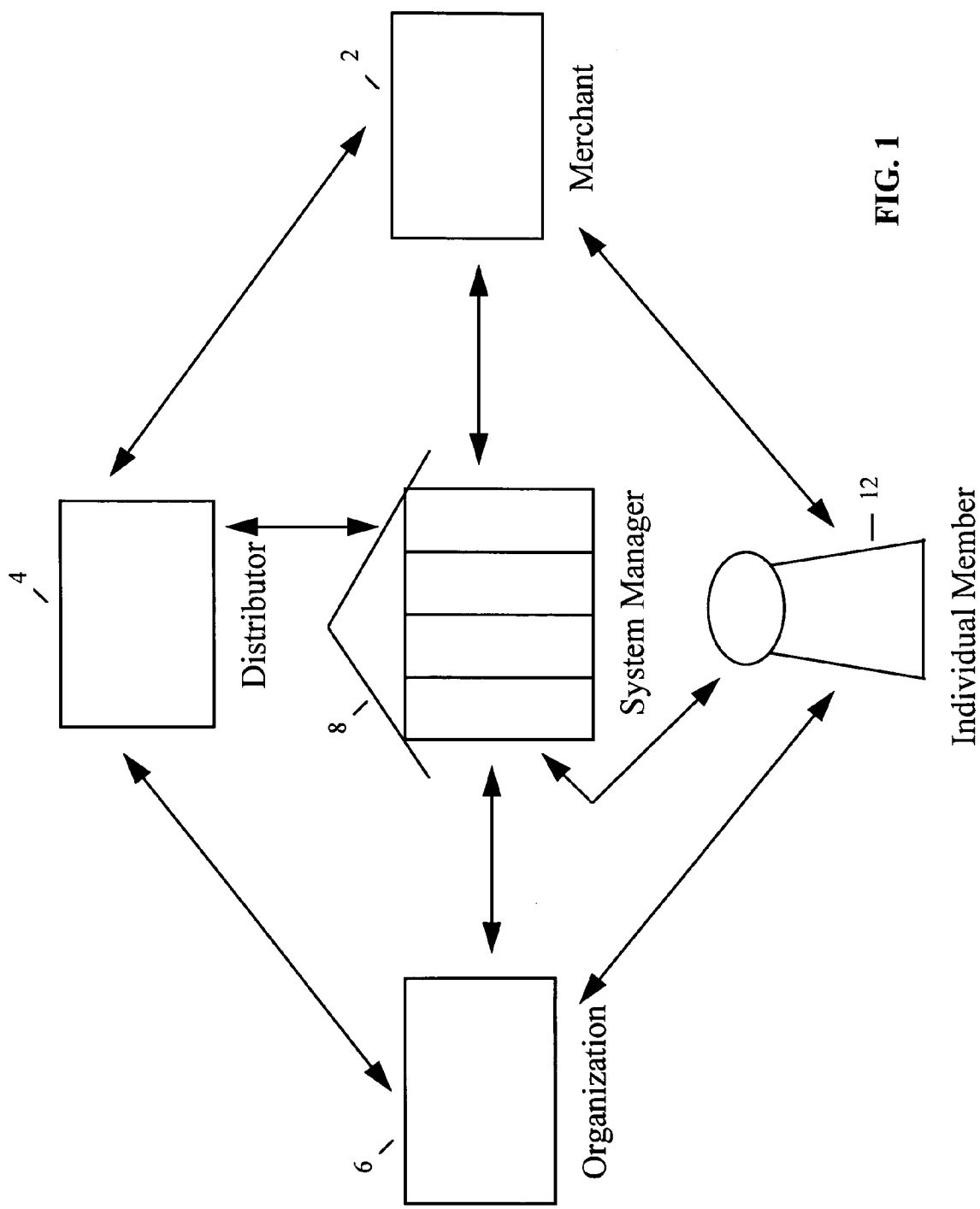
FIG. 1 shows a schematic overview of key components and the flow of information between the key components for an embodiment of the present invention.

Referring now in detail to an embodiment of the present invention, an example of which is illustrated in the accompanying drawings, FIG. 1 shows a schematic overview of key components and the flow of information between the key components for an embodiment of the present invention. The automated electronic scrip system and method for an embodiment of the present invention makes use of an electronically controlled system for the distribution and accounting of scrip, for example, between merchants 2, distributors 4, and organizations 6, that can be managed, for example, by a system manager 8. Further, the system and method of the present invention utilizes a generic scrip that can be used at all participating merchants 2. A distributor 4, such as the National Scrip Center (NSC), works with the system manager 8, which can be a financial institution, such as Citibank, to set up a database that is segmented by organization.

Figure 2:
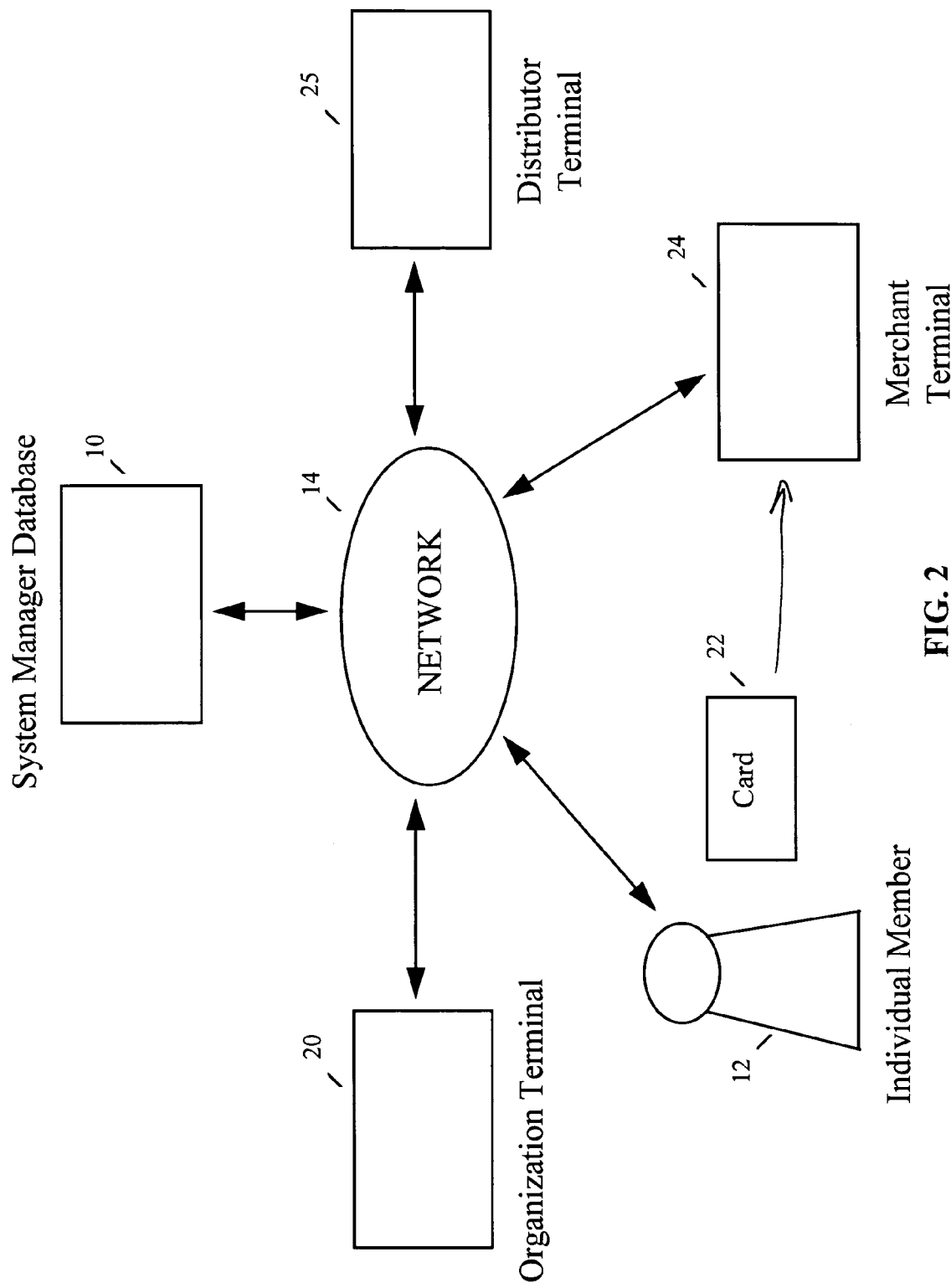
FIG. 2 is a schematic diagram which provides further detail regarding the components and the flow of information shown in FIG. 1 for an embodiment of the present invention.

FIG. 2 is a schematic diagram which provides further detail regarding the components and flow of information shown in FIG. 1 for an embodiment of the present invention. The database 10 is networked 14, interconnecting merchants' terminals 24, distributors' terminals 25, organizations' terminals 20, consumers 12 and any other participant in the automated electronic scrip system. An entity, such as the system manager 8, maintains a scrip clearing center with data processing resources, including one or more signal processing units with associated signal memory for providing on-line storage of scrip accounts for each of the scrip participants, including the distributor 4, scrip purchasing organizations 6, participating merchants 2, and members 12. In order to allow the settlement of each participant's purchase and/or redemption of the certificates, each scrip account participant also maintains at least one account, for example, with the financial institution 8.

Each of the participants in the system for an embodiment of the present invention has on-line access via network 14 to the scrip clearing center maintained, for example, by the system manager 8 for the purposes of completing and recording their scrip transactions and for reviewing their account balances. The transaction is then cleared, among the remaining scrip account participants, for example, by the system manager 8 posting the credits or debits for the transaction to the proper participant's accounts. A further aspect of an embodiment of the present invention is to replace the scrip certificate with a member's scrip card 22 which is used to identify the member 12, the member's scrip account and credit account, for example, with the financial institution 8.

FIG. 3 is a table which shows examples of the types of information stored in the system manager database 10 for an embodiment of the present invention. In addition to members' scrip accounts 19, distributors' scrip accounts 21, and organizations' scrip accounts 23, under each organization 6 in the database 10 is also a list 16 of members 12 participating in the scrip program that are affiliated with the organization 6. There is also a discount table 18 set up in the database 10, completed with the discount rate negotiated between the distributor 4 and each of the signed up participating merchants 2. The organization 6 has a terminal 20 which connects to the database 10, and an application on the organization terminal can interface with the organization's records, including the organization's consumer member records 16 in the system manager database 10.

Figure 4:
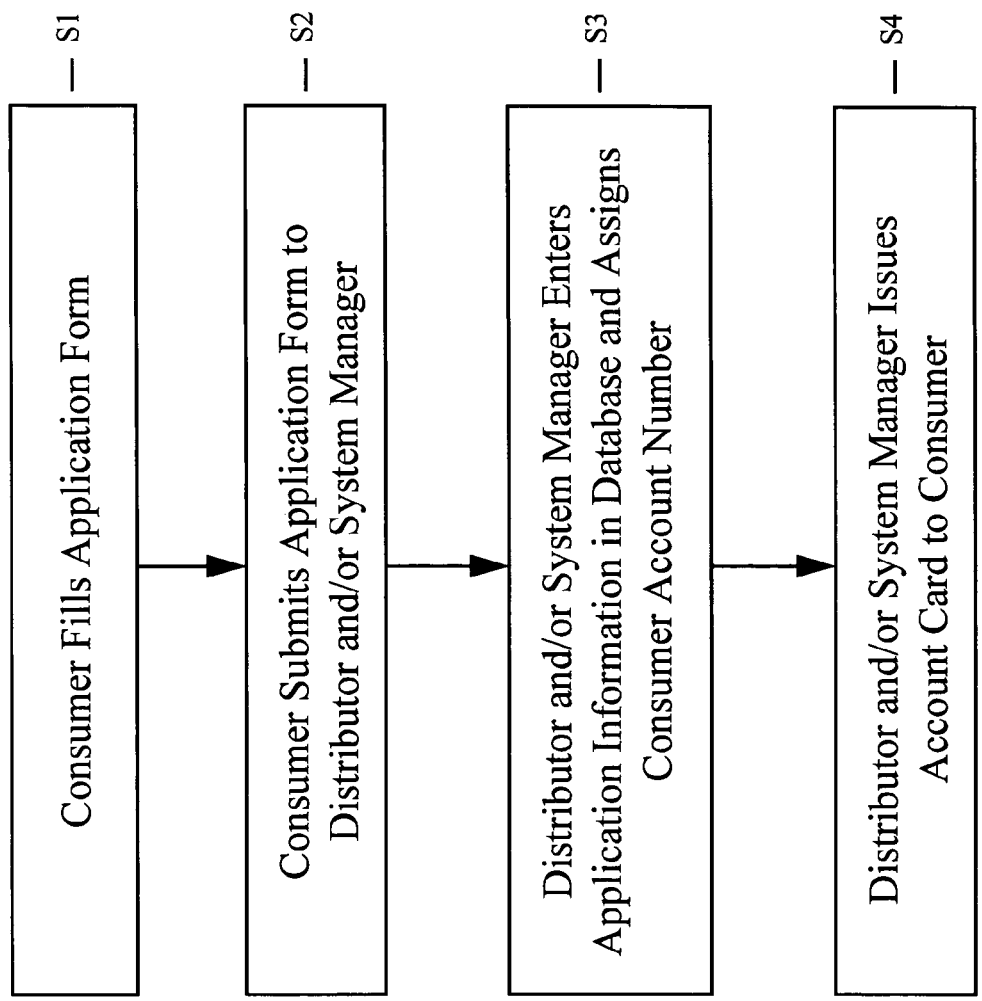
FIG. 4 is a flow chart which amplifies the flow of information shown in FIGS. 1 and 2 and provides further detail regarding the process of signing up for the automated scrip transaction system for an embodiment of the present invention.

FIG. 4 is a flow chart which amplifies the flow of information shown in FIGS. 1 and 2 and provides further detail regarding the process of signing up for the automated scrip transaction system and method for an embodiment of the present invention. A consumer 12 wishing to participate in the scrip program of the organization 6 fills out an application at S1. The application requests information, such as organization name, consumer name, address, phone number, bank account number, credit card number, and other similar information.

Another aspect of an embodiment of the present invention is an accounting system which is based on the use of the scrip card 22 issued to the scrip purchaser 12. The scrip purchaser 12, such as a member of a church parish, enrolls for the scrip card 22, for example, with the church as the sponsoring organization 6, including the purchaser's agreement to have one of the purchaser's source accounts, such as a debit, credit, or checking account, as the funding source to pay for scrip card purchases. The sponsoring organization 6 transfers or assigns the application to a third party distributor 4. The card 22 can include a PIN number to identify the card, account, and scrip purchaser 12, and can include some type of security provision, such as the PIN number.

Referring further to FIG. 4, at S2, the consumer member 12 or the organization 6 submits the application to the distributor 4 and/or the system manager 8. At S3, the distributor 4 and/or system manager 8 enters the information into the database 10 and assigns the consumer 12 a scrip account number associated with the organization 6. At S4, the distributor 4 and/or system manager 8 also issues the consumer the card 22, such as a magnetic stripe card or smart card, associated with that account. Thus, the consumer 12 is set up in the database 10 and may begin to participate in the scrip program.

Figure 5:
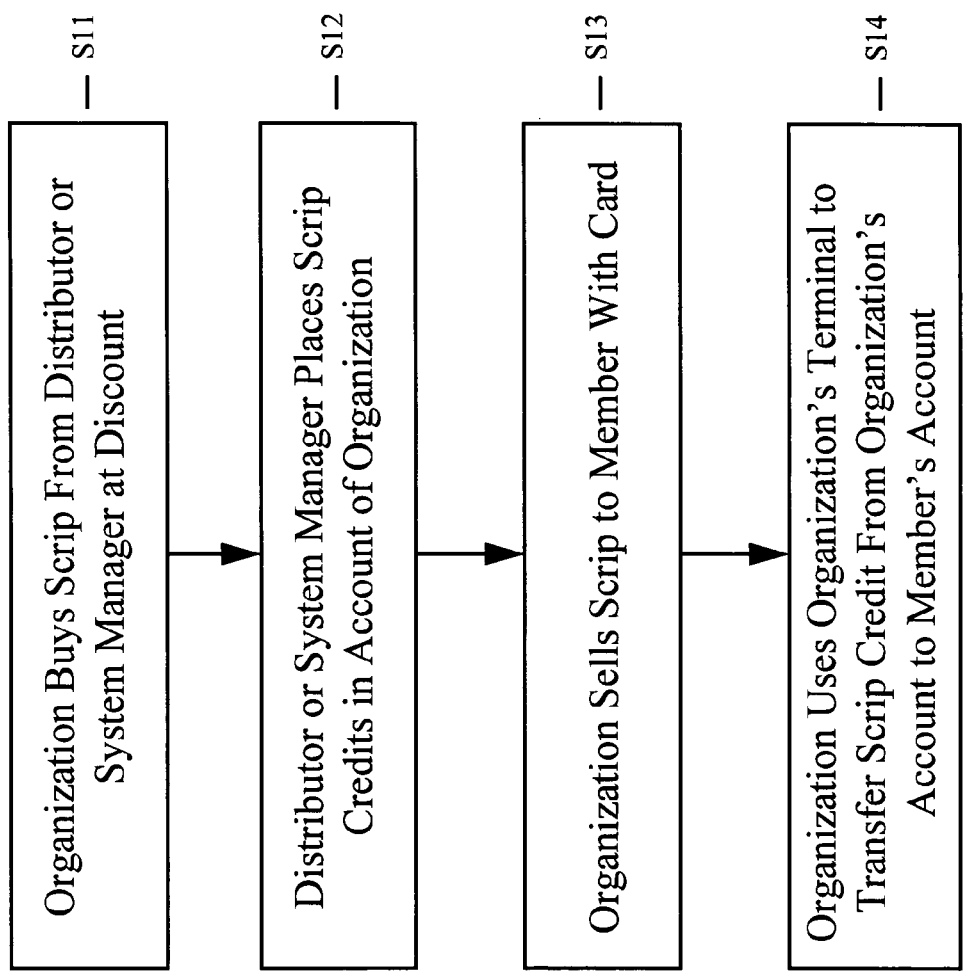
FIG. 5 is a flow chart which amplifies the flow of information shown in FIGS. 1 and 2 and provides further detail regarding the process of buying and selling automated electronic scrip for an embodiment of the present invention.

FIG. 5 is a flow chart which amplifies the flow of information shown in FIGS. 1 and 2 and provides further detail regarding the process of buying and selling automated electronic scrip for an embodiment of the present invention. At S11, the organization 6 buys the scrip up front by purchasing it from the distributor 4 or system manager 8 at a negotiated discount. At S12, the distributor 4 or system manager 8 then places the scrip credits in the account 23 of the organization 6 on the database 10. This gives the organization 6 an amount of on-hand or pre-paid scrip in the organization's account 23, which can be tracked by the system manger 8 or distributor 4.

Referring also to FIG. 5, once the member 12 is signed up and has a card 22, the member can give cash, identify an account to charge, or write a check to the organization 6 to purchase a certain amount of scrip from the organization at S13. Upon receiving the cash, account number or check, and possibly clearing the check, at S14. the organization 6 uses the organization's terminal 20 to transfer the scrip credit from the account 23 of the organization 6 to the account 19 of the member 12 on the networked system. Thus, the member 12 with the card 22 can go to one of the participating merchants 2 and consummate a transaction.

Figure 6:
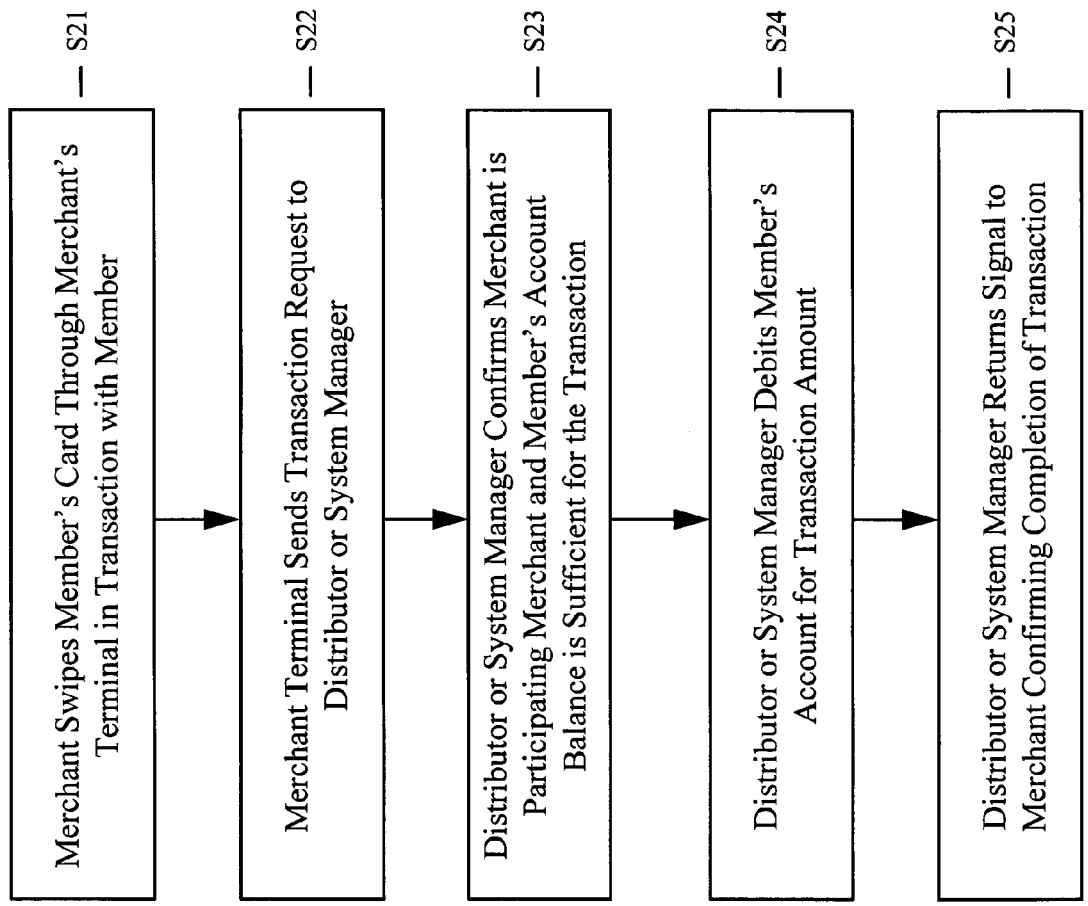
FIG. 6 is a flow chart which amplifies the flow of information shown in FIGS. 1 and 2 and provides further detail regarding the process of consummating an automated electronic scrip transaction with a scrip card at a participating merchant for an embodiment of the present invention.

FIG. 6 is a flow chart which amplifies the flow of information shown in FIGS. 1 and 2 and provides further detail regarding the process of consummating an automated electronic scrip transaction with a scrip card at a participating merchant for an embodiment of the present invention. The transaction with the merchant 2 using the scrip card 22 is somewhat similar to a typical credit or ATM type transaction. The member 12 selects goods and/or services which the member wishes to purchase from the participating merchant 22, and at S21, the scrip card 2 of the member is swiped in the merchant terminal 24 in a manner similar to a debit card. The card 22 can be a personal identification number-less (PIN-less) debit card, or the card can require a PIN.

Referring again to FIG. 6, once the card is swiped, at S22, a transaction request is sent out from the merchant terminal 24 over the network 14 to the distributor 4 or system manager 8. At S23, the distributor 4 or system manager 8 confirms the merchant number to see if the merchant 2 is a participating merchant If the merchant 2 is valid and the credit in the member's account 19 is sufficient, at S24, the account is debited for the amount of the transaction. At S25, the distributor 4 or system manager 8 then returns a signal back to the merchant 2, completing the transaction at the merchant's cash register.

In an embodiment of the present invention, the member 12 uses the card 22 at participating merchants 2 to buy goods at face value. Each purchase on the card 22 is entered through the merchant on-line terminal 24, such that all the details of the transaction, including for example, card number, amount, date, and merchant name, are provided to the system manager 8 or distributor 4. The system manager 8 or distributor 4 maintains accounts 21, 17, and 23 for the sponsoring organization 8, the card bearer 12, and the merchant 2, respectively. The system manager 8 or distributor 4 debits the funding source of the card bearer 12 in the full amount of the purchase, credits the sponsoring organization 8 with a percentage of the full price, such as 5 to 10 percent, credits the distributor's own account 19 with a percentage of the transaction face value, such as 5 to 10 percent, and credits the merchant's account 23 with the balance remaining, such as 80 to 90 percent. The system manager 8 or distributor 4 provides each of the account holders, namely the sponsoring organization 8, card bearer 12, and merchant 2, with account statements on a periodic basis, such as monthly.

Figure 7:
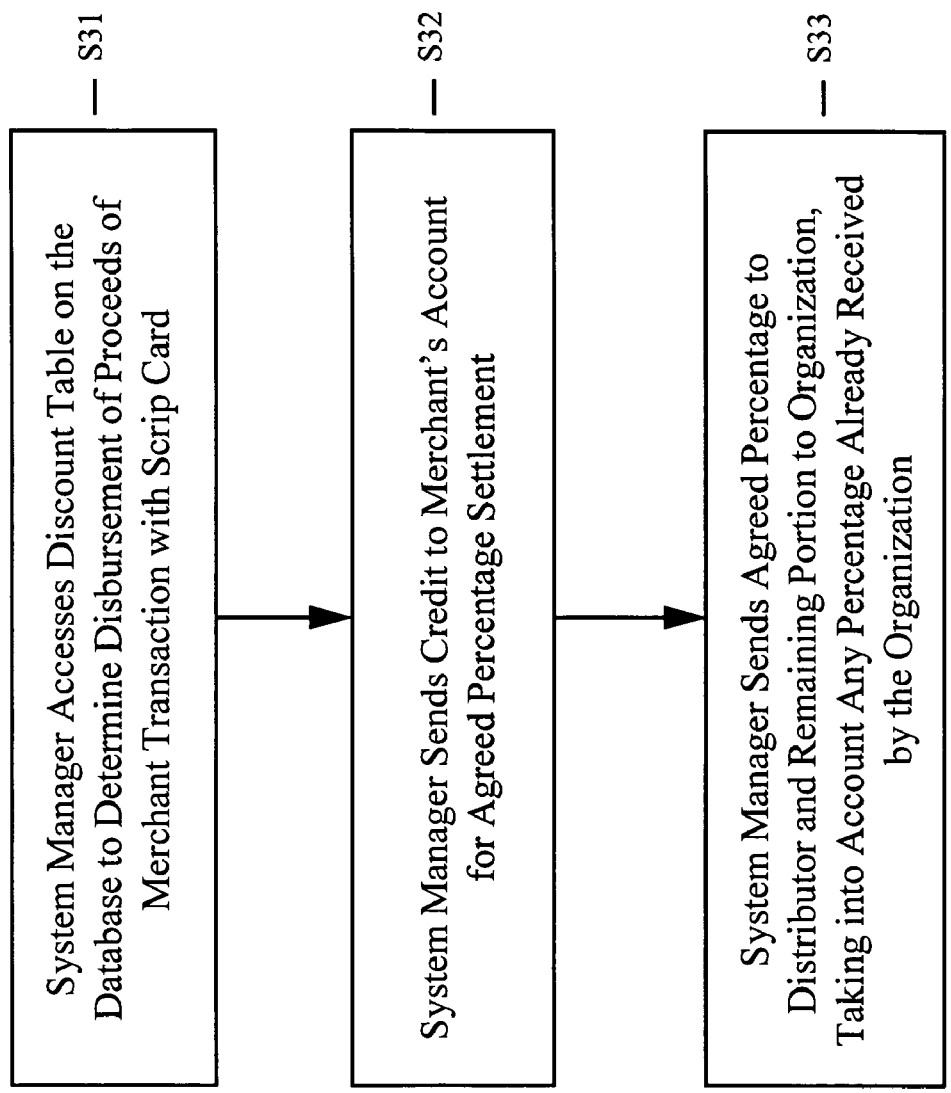
FIG. 7 is a flow chart which amplifies the flow of information shown in FIGS. 1 and 2 and provides further detail regarding the process of settling the automated electronic scrip transaction for an embodiment of the present invention.

When the transaction is completed, the distributor 4, or preferably the system manager 8, such as Citibank, performs a settlement on that transaction. FIG. 7 is a flow chart with amplifies the flow of information shown in FIGS. 1 and 2 and provides further detail regarding the process of settling the automated electronic scrip transaction for an embodiment of the present invention. At S31, the system manager 8 accesses the discount table 18 on the database 10 to determine how to disburse the money from the transaction. For example, assume that the merchant 2 in the above transaction agreed to a 95 percent settlement. Therefore, at S32, the system manager 8 sends a credit to the account of the merchant 2 for the agreed percentage settlement, or 95 percent of the value of the transaction.

Referring further to FIG. 7, at S33, the system manager also apportions the remaining 5 percent with an agreed portion going to the distributor 4, such as the National Script Center to help, for example, to support its work, and the remaining portion going to the organization 6, after taking into account any percentage that the organization may have already received. For example, assume that the agreed portion for the distributor 4 is 1 percent of the transaction. Assume also, that the organization 6 already received 2 percent on the transaction, based on the organization's transferring on-hand scrip credits from the organization's account to the account of the member 12. In such case, the amount going to the organization 6 after the merchant transaction is the remaining 2 percent of the transaction.

To illustrate further, assume that the member 12 gives the organization 6 the sum of $100 for transfer into the member's scrip account 17. The organization 6 transfers $100 worth of on-hand or pre-paid scrip credit from the organization's account 21 to the member's account 17. Assume also that the organization 6 paid the distributor 4 or system manager 8 the sum of only $98 for the $100 worth of scrip credit, based on a pre-pay agreement with the distributor. The member 12 then goes to a participating merchant 2 and performs a $100 transaction with the member's scrip card 22. The card 22 is swiped in the merchant terminal 24, and the merchant number, member account number, and the amount of the transaction are sent over the network 14 to the system manager 8. The system manager 8 verifies that the merchant 2 is a participating merchant, verifies the account number of the member 12 and that the member's account 17 has enough credit in it to cover the transaction.

Continuing with the illustrative example, once all of this is approved, the system manager 8 sends the approval to the merchant 2. The merchant 2 completes the transaction and the member 12 buys the $100 worth of items. Meanwhile, the system manager 8 references the agreement of the distributor 4 with the merchant 2 and sees that a 95 percent discount rate applies and transfers $95 into the merchant's account 23. The system manager 8 then settles the remaining 5 percent or $5. The system manager 8 transfers a previously agreed upon amount, such as 1 percent or $1, into the distributor's account 19. Finally, the system manager 8 knows that the organization 6 already received 2 percent, because the scrip in the member's account 17 was transferred from the organization's pre-paid or on-hand account 21. Thus, since the organization 6 already essentially received 2 percent or $2 on this transaction, the system manager 8 sends the organization the remaining 2 percent or $2. Therefore, the settlement process for the $100 transaction is complete.

In the foregoing example, the member's account 17 showed a purchase of scrip of $100. In another aspect of an embodiment of the present invention, the organization 6 may have direct access to the member's account 17 by the agreement of the member 12. The organization 6 can have access to the member's account 17, so that the organization can keep track of the member's performance. For example, as part of the fund raising for the organization 6, the member 12 may be required to buy a certain value of scrip in the year. If the member 12 does not make the required purchase, the organization 6 can notify the member 12, because the member may be enjoying benefits from the organization for making a pledge to purchase a certain amount of scrip. For example, if the organization 6 is a school, the member 12 may be paying a reduced amount for tuition for the member's children in return for the pledge. If the member 12 made a pledge, the organization 6 can remind the member of the pledge.

In an alternate embodiment of the present invention, the scrip system functions similarly to that described above. However, the member 12 pays for the scrip credit directly from the member's own account, such as a checking or savings account, rather than through the organization 6. Such an alternate embodiment can be referred to as a direct pay scrip system. In such embodiment, use of the scrip card 22 debits a checking, savings, debit or credit account designated by the member 12. In this embodiment, when a member 12 uses the scrip card 22 for a transaction, the system manager 8 or distributor 4 receives the request and either automatically debits the account, such as a debit or credit account. Alternatively, the system manager 8 or distributor 4 checks the account for fund availability and then debits the account, such as the checking or savings account. The remaining process steps are similar to those shown in FIGS. 4, 6, and 7.

The foregoing alternate embodiment allows the member 12 to use the scrip card 22 without having to make a special effort to designate certain funds for a special scrip account. The member 12 is still affiliated with an organization 6 as indicated when the member signs up, and the organization still receives some benefit on all purchases made by the member. However, the organization 6 is not directly involved in the scrip transfer transaction, which reduces the complexity of the relationships and accounting. Further, the manpower required by the organization 6 to participate in the system is likewise reduced. In essence, the alternate embodiment allows the organization 6 to concentrate on recruiting new members to the system, while still giving the organization all the benefits of the automated electronic scrip system of the present invention.

Another aspect of an embodiment of the present invention incorporates a merchant loyalty program with the electronic scrip transaction system of the present invention and provides a mechanism for awarding, for example, tuition credit points for educational institution tuition, such as school or college tuition, in conjunction with the merchant loyalty program. For example, the scrip system for an embodiment of the present invention is combined with a standard merchant loyalty program, and merchant loyalty points are maintained on a smart card used as the scrip card 22 and/or on a database, such as database 10.

In such aspect of an embodiment of the present invention, a merchant loyalty point account is maintained for the member 12, for example on the smart card used as the scrip card 22 and/or in the database, such as database 10, and the member is awarded loyalty points by the participating merchant 2, for example, for each use of the member's scrip card 22 in a transaction with the merchant. The member's merchant loyalty account can be accessed when the member 12 performs a transaction with the participating merchant 2 at the merchant terminal 24, and the loyalty points in the member's loyalty point account can be displayed, for example, at the merchant terminal 24. Thus, the member 12 can make a purchase from the merchant 2 using, for example, a combination of scrip credit, cash, and/or redeemed loyalty points.

Additionally, in such an aspect of an embodiment of the present invention, as merchant loyalty points accumulate in the member's loyalty point account to a pre-defined threshold level, an entity, such as the system manager 8, which can be a financial institution such as Citibank, also opens a tuition credit account for the member 12, for example, on database 10. Thus, as the member 12 is awarded loyalty points for purchasing merchandise or services from the participating merchant 2, the loyalty points are made into tuition credit points, which provides additional value to the member. Further, the participating merchant 2 and the financial institution receive the benefit of favorable publicity, and participation by the financial institution adds credibility.

A further aspect of an embodiment of the present invention is use of a smart card as the member's scrip card 22, which provides, for example, for authentication of the member 12 through the use of a digital certificate stored the smart card and the ability to sign a transaction with a public key on the card. Use of such a smart card as the scrip card 22 provides additional security, for example, to storage on the scrip card of loyalty points in conjunction with the scrip program.

In an embodiment of the present invention, a transaction with the scrip card 22 appears no different to a member 12 than current merchant terminal transactions. However, with the use of the scrip card 22, the transaction receipt may contain a special report of the scrip account 17 balance, or a separate special receipt may be printed. Further, the scrip card 22 cannot be used at an automated teller machine (ATM) or at the merchant terminal 24 to withdraw cash in exchange for the scrip credit value in the member's account 17.

The automated electronic scrip system for an embodiment of the present invention allows the use of either generic scrip or merchant specific scrip. However, generic scrip is preferred, since it allows for greater flexibility, in that a member 12 can use it at any participating merchant 2 without the concern of having enough merchant specific scrip in the member's account. Nevertheless, the system for an embodiment of the present invention is robust enough to allow for the use of merchant specific scrip. A distinction between the use of generic scrip and merchant specific scrip for an embodiment of the present invention is that instead of having one scrip value in the member's account 17, in a merchant specific scrip system, the member 12 has numerous sub-accounts associated with specific merchants within the member's main account. Thus, when the member 12 purchases scrip, the member must designate how to distribute the scrip among the sub-accounts. Alternatively, the scrip may go into a general account that can be accessed by the sub-accounts as necessary, such as when a sub-account does not have enough scrip.

In this regard, an important aspect of the alternate embodiment direct pay scrip system described above is that separate sub-accounts are not required. Since the member's account 17 is directly debited in the direct pay scrip system, as long as the merchant 2 is a participating merchant, then the member 12 can use the scrip card 22 without the concern of having enough scrip credit in a merchant specific account. The member's account 17 is simply debited the transaction amount with reference to the specific merchant 2.

The system and method for an embodiment of the present invention has all of the benefits associated with the prior art scrip currency in terms of providing benefits to the sponsoring organization 6, while allowing the members 12 the fair market value for the scrip at participating merchants 2. In the prior art scrip currency system, the merchants themselves sold the scrip to the distributor so as to have the advantage of "float time" on the discounted value of the scrip that they received initially. With all other aspects being equal to the scrip currency scenario, an embodiment of the present invention shifts the float time advantage from the merchant 2 to the distributor 4, but offsets this shift in terms of the overhead associated with accounting for the scrip transactions, since accounting for scrip transactions is no longer an overhead item for the merchant 2. In addition, the card 22 provides overall security above that of a scrip currency in terms of lost currency, counterfeit, and the like. Also, in addition to reducing the administrative overhead associated with otherwise manual accounting, the system, for an embodiment of the present invention, has the advantage of any automated processing system in terms of settling accounts among the participants in near real time.

Additionally, in an embodiment of the present invention, the scrip card 22 can carry the logos and/or UCC codes of the participating merchants 2. The logos remind the members 12 about the participating merchants 2 as well as providing advertising for the merchants. Further, the electronic scrip system of an embodiment of the present invention eliminates the problem of the member 12 having to carry around bulky, paper scrip. In addition, an embodiment of the present invention promotes the use of generic scrip that can be purchased by the member 12 based purely on value, without regard to having to plan ahead and divide the total purchase into different merchants' scrip. Generic scrip eliminates the problem of a member 12 having to be concerned about having enough credit in a particular merchant's scrip. Thus, the present invention allows the member 12 to focus only on the total value of scrip credit in the member's account 17.

Various preferred embodiments of the invention have been described in fulfillment of the various objects of the invention. It should be recognized that these embodiments are illustrative of the principles of the present invention. Numerous modifications and adaptations thereof will be readily apparent to those skilled in the art without departing from the spirit and scope of the present invention. Accordingly, the invention is limited only by the following claims.

What is claimed is:

1. A method of performing a transaction between a merchant and a member with electronic scrip, comprising:
   receiving information relating to the transaction between the merchant and the member, including a transaction amount;
   automatically debiting an account of the member by the transaction amount;
   automatically crediting a predetermined merchant portion of the transaction amount to an account of the merchant; and
   automatically crediting a predetermined balance portion of the transaction amount to at least one of a sponsoring organization account and a scrip distributor account.

2. The method of claim 1, wherein receiving information further comprises entering the information at a terminal.

3. The method of claim 2, wherein entering the information further comprises entering the information at the terminal coupled over a network at at least one of a system manager terminal and a scrip distributor terminal.

4. The method of claim 2, wherein entering the information at the terminal further comprises entering the information at a merchant terminal.

5. The method of claim 2, wherein entering the information further comprises entering data for the member from a scrip card at the terminal.

6. The method of claim 5, wherein entering data further comprises entering the data for the member from a magnetic stripe scrip card at the terminal.

7. The method of claim 5, wherein entering data further comprises entering the data from an application on a smart scrip card for the member at the terminal.

8. The method of claim 5, wherein the data further comprises an account number for the member.

9. The method of claim 1, wherein receiving information further comprises receiving the information by at least one of a system manager at a system manager terminal and a scrip distributor at a scrip distributor terminal.

10. The method of claim 9, wherein receiving the information further comprises receiving the information by the system manager at the system manager from a merchant terminal over a network.

11. The method of claim 9, wherein receiving the information further comprises receiving the information by the scrip distributor at the scrip distributor terminal from a merchant terminal over a network.

12. The method of claim 1, wherein receiving the information further comprises receiving a request for the transaction by at least one of a system manager and a scrip distributor.

13. The method of claim 12, wherein receiving the request by the system manager further comprises receiving the request by the system manager at a system manager terminal from a merchant terminal over a network.

14. The method of claim 12, wherein receiving the request by the scrip distributor further comprises receiving the request by the scrip distributor at a scrip distributor terminal from a merchant terminal over a network.

15. The method of claim 12, wherein receiving the request further comprises receiving data identifying at least one of the member account and the merchant.

16. The method of claim 1, wherein automatically debiting further comprises automatically sending a request for the transaction from a terminal over a network to at least one of a system manager at a system manager terminal and a scrip distributor at a scrip distributor terminal.

17. The method of claim 16, wherein automatically sending the request to the system manager further comprises receiving the request by the system manager at the system manager terminal.

18. The method of claim 17, wherein receiving the request by the system manager further comprises receiving data by the system manager identifying at least one of the member account and the member.

19. The method of claim 18, wherein receiving the data by the system manager further comprises confirming a balance by the system manager in the identified member account adequate to cover the transaction amount.

20. The method of claim 19, wherein confirming the balance by the system manager further comprises confirming the balance by the system manager in at least one account of the member selected from a group consisting of a member scrip account, a member checking account, and a member savings account.

21. The method of claim 16, wherein automatically sending the request to the scrip distributor further comprises receiving the request by the scrip distributor at the scrip distributor terminal.

22. The method of claim 21, wherein receiving the request by the scrip distributor further comprises receiving data by the scrip distributor identifying at least one of the member account and the member.

23. The method of claim 22, wherein receiving the data by the scrip distributor further comprises confirming a balance by the scrip distributor in the identified member account adequate to cover the transaction amount.

24. The method of claim 23, wherein confirming the balance by the scrip distributor further comprises confirming the balance by the scrip distributor in at least one account of the member selected from a group consisting of a member scrip account, a member checking account, and a member savings account.

25. The method of claim 1, wherein automatically debiting the member account further comprises automatically debiting at least one account of the member selected from a group consisting of a scrip account, a banking account, and a checking account.

26. The method of claim 25, wherein automatically debiting the member scrip account further comprises storing data in the member scrip account representing member scrip credit.

27. The method of claim 26, wherein the data representing member scrip credit further comprises transferring the member scrip credit from at least one of a sponsoring organization account and a scrip distributor account.

28. The method of claim 27, wherein transferring the member scrip credit from the organization account further comprises storing data in the organization account representing organization scrip credit.

29. The method of claim 28, wherein storing the data representing organization scrip credit further comprises transferring the organization scrip credit from a scrip distributor account.

30. The method of claim 29, wherein transferring the organization scrip credit further comprises storing data in the scrip distributor account representing distributor scrip credit.

31. The method of claim 30, wherein storing the data representing distributor scrip credit further comprises purchasing the distributor scrip credit from the merchant.

32. The method of claim 27, wherein transferring the member scrip credit from the scrip distributor account further comprises storing data in the scrip distributor account representing distributor scrip credit.

33. The method of claim 32, wherein storing the data representing distributor scrip credit further comprises purchasing the distributor scrip credit from the merchant.

34. The method of claim 1, wherein automatically debiting further comprises automatically sending confirmation of the debit to the merchant.

35. The method of claim 34, wherein automatically sending the confirmation further comprises automatically sending the confirmation to the merchant at a merchant terminal over a network.

36. The method of claim 35, wherein automatically sending the confirmation further comprises automatically sending the confirmation to the merchant terminal over a network by at least one of a system manager at a system manager terminal and a scrip distributor at a scrip distributor terminal.

37. The method of claim 1, wherein automatically debiting further comprises automatically storing merchant loyalty point credit for the member in connection with the transaction amount.

38. The method of claim 37, wherein automatically storing further comprises automatically storing tuition credit for the member in connection with the transaction amount based on attaining a threshold level of stored loyalty point credit.

39. The method of claim 1, wherein automatically crediting the merchant portion further comprises automatically determining the merchant portion according to a predetermined merchant percentage of the transaction amount.

40. The method of claim 39, wherein automatically determining the merchant portion further comprises automatically consulting a look-up table for the predetermined merchant percentage.

41. The method of claim 40, wherein automatically consulting the look-up table further comprises storing the predetermined merchant percentage in the look-up table in a database coupled over a network to at least one of a system manager terminal and a scrip distributor terminal.

42. The method of claim 1, wherein automatically crediting the merchant portion further comprises automatically crediting the merchant portion of the transaction by at least one of a system manager and a scrip distributor.

43. The method of claim 42, wherein automatically crediting the merchant portion by the system manager further comprises automatically crediting the merchant portion by the system manager at a system manager terminal coupled over a network to a database storing the merchant account.

44. The method of claim 43, wherein automatically crediting the merchant portion by the scrip distributor further comprises automatically crediting the merchant portion by the scrip distributor at a scrip distributor terminal coupled over a network to a database storing the merchant account.

45. The method of claim 1, wherein automatically crediting the predetermined balance portion to the scrip distributor account further comprises automatically determining the balance portion for the scrip distributor account according to a predetermined scrip distributor percentage of the transaction amount.

46. The method of claim 45, wherein automatically determining the balance portion for the scrip distributor account further comprise automatically consulting a look-up table for the predetermined scrip distributor percentage.

47. The method of claim 46, wherein automatically consulting the look-up table further comprises storing the look-up table in a database coupled over a network to at least one of a system manager terminal and a scrip distributor terminal.

48. The method of claim 1, wherein automatically crediting the predetermined balance portion to the sponsoring organization account further comprises automatically determining the balance portion for the sponsoring organization account according to a predetermined sponsoring organization percentage of the transaction amount.

49. The method of claim 48, wherein automatically determining the balance portion for the sponsoring organization account further comprises automatically consulting a look-up table for the predetermined sponsoring organization percentage.

50. The method of claim 49, wherein automatically consulting the look-up table further comprises storing the look-up table in a database coupled over a network to at least one of a system manager terminal and a scrip distributor terminal.

51. The method of claim 48, wherein automatically determining the balance portion for the sponsoring organization account further comprises automatically deducting a previously received percentage of the transaction amount from the balance portion for the sponsoring organization account.

52. A system for performing a transaction between a merchant and a member with electronic scrip, comprising:
   means for receiving information related to the transaction between the merchant and the member, including a transaction amount;
   means associated with the information receiving means for automatically debiting an account of the member by the transaction amount;
   means associated with the information receiving means for automatically crediting a predetermined merchant portion of the transaction amount to an account of the merchant; and
   means associated with the information receiving means for automatically crediting a predetermined balance portion of the transaction amount to at least one of a sponsoring organization account and a scrip distributor account.

53. The system of claim 52, wherein the information receiving means further comprises a terminal.

54. The system of claim 53, wherein the information receiving means further comprises a merchant terminal.

55. The system of claim 54, wherein the information receiving means further comprises the merchant terminal coupled over a network to at least one of a system manager terminal and a scrip distributor terminal.

56. The system of claim 55, further comprising a member scrip card readable by the merchant terminal.

57. The system of claim 56, wherein the member scrip card further comprises at least one of a magnetic stripe scrip card and a smart card.

58. The system of claim 52, wherein the debiting means further comprises a merchant terminal coupled over a network to at least one of a system manager terminal and a scrip distributor terminal.

59. The system of claim 58, wherein the debiting means further comprises a database storing the member account coupled over the network to at least one of the system manager terminal and the scrip manager terminal.

60. The system of claim 59, wherein the member account further comprises at least one of a member scrip account, a member checking account, and a member savings account.

61. The system of claim 52, wherein the means for crediting the merchant portion further comprises a database storing the merchant account coupled over a network to at least one of a system manager terminal and a scrip distributor terminal.

62. The system of claim 61, wherein the means for crediting the merchant portion further comprises a look-up table of predetermined merchant percentage for determining the merchant portion stored in the database.

63. The system of claim 52, wherein the means for crediting the predetermined portion to the scrip distributor account further comprises a database storing the scrip distributor account coupled over a network to at least one of a system manager terminal and a scrip distributor terminal.

64. The system of claim 63, wherein the means for crediting the predetermined balance portion to the scrip distributor account further comprises a look-up table of predetermined scrip distributor percentage for determining the scrip distributor portion stored in the database.

65. The system of claim 52, wherein the means for crediting the predetermined balance portion to the sponsoring organization account further comprises a database storing the sponsoring organization account coupled over a network to at least one of a system manager terminal and a scrip distributor terminal.

66. The system of claim 65, wherein the means for crediting the predetermined balance portion to the sponsoring organization account further comprises a look-up table of predetermined sponsoring organization percentage for determining the sponsoring organization portion stored in the database.

67. The method of claim 1, wherein automatically debiting the account of the member further comprises:
   providing a scrip clearing center having data processing resources, including one or more signal processing units with associated signal memory for on-line storage of scrip accounts for each of a plurality of scrip participants, consisting at least in part of a scrip distributor, a scrip sponsoring organization, participating merchants, and members;
   storing scrip account information in the scrip clearing center by a system manager for at least one member consisting at least in part of a scrip account number associated with the scrip sponsoring organization and providing the member a scrip card associated with the scrip account;
   storing pre-paid electronic scrip credit by the system manager in a scrip account of the scrip sponsoring organization purchased from the scrip distributor at a negotiated merchant discount; and
   allowing a transfer of a portion of the pre-paid electronic scrip credit from the scrip account of the scrip sponsoring organization to the member's scrip account upon receipt by the scrip sponsoring organization of payment for said portion of the pre-paid electronic scrip credit on behalf of the member.

68. The method of claim 67, wherein automatically crediting a predetermined balance portion of the transaction amount further comprises:
   crediting a predefined scrip sponsoring organization portion of the transaction amount to an account for the scrip sponsoring organization and a predefined scrip distributor portion of the transaction amount to a scrip distributor account by the system manager, according to look-up table parameters stored in the scrip clearing center.

69. A method for performing a transaction between a merchant and a member with electronic scrip, comprising:
   providing a scrip clearing center having data processing resources, including one or more signal processing units with associated signal memory for on-line storage of scrip accounts for each of a plurality of scrip participants, consisting at least in part of a scrip distributor, a scrip purchasing organization, participating merchants, and members;
   storing scrip account information in the scrip clearing center by the system manager for at least one member consisting at least in part of a scrip account number associated with the purchasing organization and providing the member a scrip card associated with the scrip account;

storing pre-paid electronic scrip credit by the system manager in a scrip account of the scrip purchasing organization purchased from the scrip distributor at a negotiated merchant discount;

allowing a transfer of a portion of the pre-paid electronic scrip credit from the scrip account of the scrip purchasing organization to the member's scrip account upon receipt by the scrip purchasing organization of payment for said portion of the pre-paid electronic scrip credit on behalf of the member;

receiving information relating to a transaction between one of the participating merchants and the member by the system manager via a network from a merchant terminal, consisting at least in part of a merchant identifier, member identification and scrip account data for the member from the scrip card, a transaction request, and the transaction amount;

confirming a balance adequate to cover the transaction amount by the system manager in the member's scrip account; and if the balance is adequate, debiting the member's scrip account for the transaction amount by the system manager, sending a confirmation of the debit to the merchant terminal via the network by the system manager, and crediting a predefined merchant portion of the transaction amount to an account of the merchant, a predefined scrip purchasing organization portion of the transaction amount to an account for the scrip purchasing organization, and a predefined scrip distributor portion of the transaction amount to a scrip distributor account by the system manager, according to look-up table parameters stored in the scrip clearing center.

* * * * *